March 12, 1957 — H. R. NOYES — 2,785,017
SPARKLESS GROOVED WHEEL
Filed Dec. 27, 1954
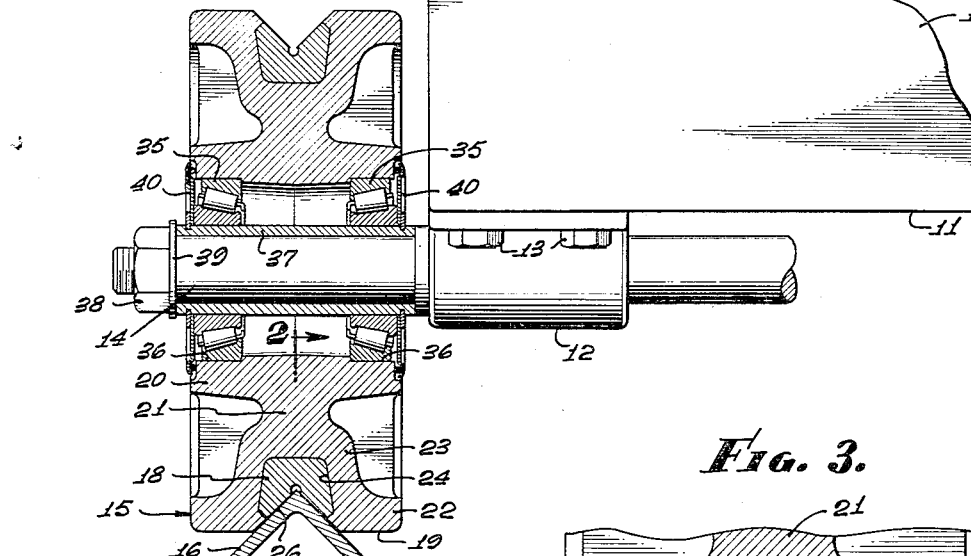
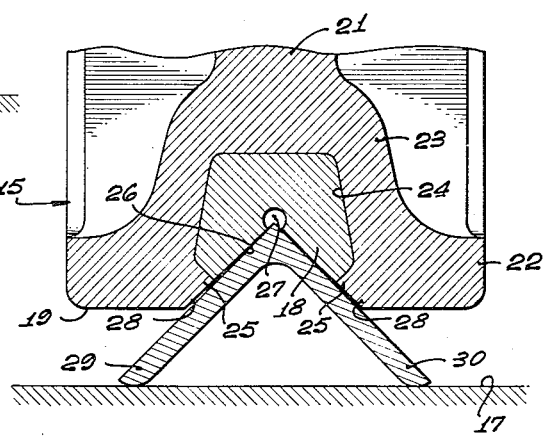
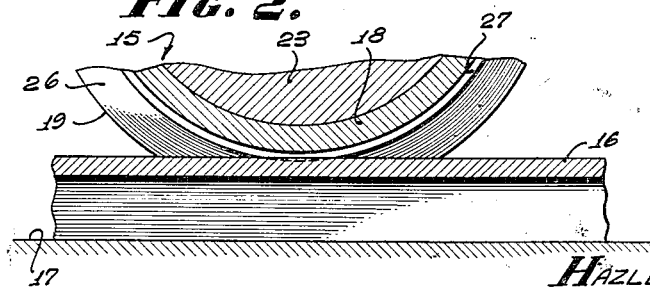
HAZLEHURST ROSS NOYES
INVENTOR.
Huebner, Beehler, Worrel & Herzig
BY
ATTORNEYS.

United States Patent Office 2,785,017
Patented Mar. 12, 1957

2,785,017

SPARKLESS GROOVED WHEEL

Hazlehurst Ross Noyes, Hollywood, Calif., assignor to Aerol Co., Inc., Los Angeles, Calif., a corporation of California Application December 27, 1954, Serial No. 477,609

1 Claim. (Cl. 301—5)

The invention relates to wheels and has particular reference to wheels of a type used on trucks, dollies, and the like without application of traction force to the wheel. More particularly the invention relates to a substantially integrally formed wheel which has a tread adapted to operation on different types of rolling supports.

In some manufacturing operations a considerable number of trucks and dollies are used for transporting materials and work over a factory floor. In some instances trucks and dollies of this description are built to support relatively heavy loads. An example of this is in the assembly of air frames wherein the parts are progressively assembled into one composite assembly. Although the initial sub-assemblies may be relatively small and light in weight, as they accumulate the parts the ultimate composite assembly is often an extremely heavy piece. Convenience has dictated the mounting of these sub-assemblies and assemblies on trucks or dollies which can be moved freely to any location in the factory floor area. Because of the fact that the transporting vehicle, namely, the truck or dolly, must ultimately support a great weight, wheels of particularly sturdy construction are requisite.

Among those wheels sought to be used for this purpose in the past have been wheels initially designed for other uses. Many such wheel have incorporated a steel tread for supplying the necessary resistance to wear and to provide sufficient strength. Difficulties arise in use of steel treaded wheels because of the fact that they tend to create sparks as a result of friction which in many factory operations are dangerous. Where resort has been had to metals which minimize sparking, the metals found usable from the point of view of strength, a minimum of sparking tendency, and in a price range permitting wide-spread use, have been such as to wear poorly, necessitating frequent and costly replacement.

It is therefore among the objects of the invention to provide a new and improved wheel having a composite tread which makes use of properly selected materials to minimize sparking when in contact with the floor and on the other hand to provide the necessary strength and wear-resistant qualities where the wheel can be employed on surfaces other than a floor surface.

Another object of the invention is to provide a new and improved wheel of integral construction constructed preferably by casting wherein materials of entirely different characteristics are combined in the wheel in such a fashion that the individual characteristics of each respective material are taken advantage of under special circumstances.

Still another object of the invention is to provide a new and improved wheel of cast structure composed of combined metals of different characteristics so joined together that the wheel can be produced inexpensively without sacrifice to desired sturdiness, wear-resistant characteristics and minimization of tendency to create friction sparks when rolled over a floor.

Still further among the objects of the invention is to provide a new and improved wheel adapted to employment on different types of wearing surfaces wherein the main portion of the wheel is cast of relatively inexpensive and somewhat soft material necessitating the provision of a wide wearing surface but wherein there is included a special band of ferrous material grooved for application to a special track and wherein the ferrous material is so located that, despite its natural tendency to permit sparks to form, the sparking tendency is precluded without sacrificing the utility inherent in employment of the ferrous metal.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a longitudinal elevational view of the device shown mounted as it would be in use.

Figure 2 is a fragmentary cross-sectional view taken on the line 2—2 of Figure 1.

Figure 3 is a fragmentary view showing the formation of the tread portion of the wheel in greater detail.

Figure 4 is a fragmentary view similar to Figures 2 and 3 but showing the wheel resting directly on the floor.

In the embodiment chosen for the purpose of illustration there is shown a fragment of a truck body 10 having a lower surface or deck 11 upon which a shackle 12 is secured by means of bolts 13. A wheel shaft 14 retained by the shackle extends outwardly from the truck body to a location where it can receive a wheel 15. The wheel is shown riding upon a truck 16 which in the example chosen has the form of an angle-iron with legs of equal length. The angle-iron track is located on a floor 17 providing a support for the track. At the same time the floor may also support the wheel 15 when it is run off the track, as illustrated in Figure 4.

The wheel is essentially a cast body or wheel structure which may be indicated as a structure of uniform texture and consistency except for the inclusion therein of a tread insert 18. To avoid sparks the wheel structure may be made of a castable material such as one of the commercial thermosetting plastics or of some relatively soft metallic substance such, for example, as one of the commercial alloys of aluminum. The selection of aluminum gives the wheel structure several advantageous characteristics. Aluminum alloys can be made very tough and when a sufficiently broad wearing surface is provided for as represented by a tread 19, the tread will have good wearing characteristics. The softness of the aluminum alloy is especially beneficial in that it has almost no tendency to strike sparks when rubbed frictionally upon any one of a great variety of floor surfaces whether metallic or of some aggregate mix such as concrete.

Moreover, a metallic alloy of the general character of aluminum is especially well adapted to casting. When cast it can be molded with considerable facility and further, because of having a melting point lower than that of iron and steel, is capable of having an iron or steel insert molded into the aluminum wherein the steel will retain its form and be firmly anchored in combination with the aluminum. Thermosetting plastic material can be similarly combined.

The wheel structure consists essentially of a hub 20 from which an annular rim support 21 extends radially outwardly. At the outer end of the rim support is a rim 22 which carries the tread or tread surface 19 already referred to. The rim has an inner enlarged portion 23 which contains an annular recess 24, the recess being provided with annular overhanging flanges 25 at the end of the recess adjacent the tread 19. The tread insert 18 substantially fills the annular recess 24 and is additionally contained within the recess by the positioning of the overhanging flanges 25. It has been found advantageous to form the wheel structure by casting and to cast the tread insert in the wheel structure, thus to form the annular recess which contains the tread insert.

Prior to casting, the tread insert is provided with a substantially V-shaped groove 26, the apex of which is broken by an opening 27 substantially circular in cross-section. It will be noted further that the rim of the wheel structure contains extensions 28 of the V-shaped groove and further than the included angle between sides of the V-shaped groove and the extensions is slightly greater than the 90-degree angle formed by legs 29 and 30 of the angle-iron which comprises the track 16. Due to this configuration whenever the wheel structure is rolled upon the track, it will be with assurance that it is the tread insert 18 which carries the load on the track rather than any portion of the wheel structure. Inasmuch as the tread insert is made of iron or steel, the wearing quality of the wheel when riding on the track will be materially enhanced. At the same time due to the fit of the track in the groove, there will not at this time be any likelihood of striking sparks.

For mounting the wheel on the shaft 14 there are provided conventional bearing rings 35 fitting at opposite ends of a bearing recess 36 in the hub. The bearing rings are designed and mounted to engage a sleeve 37 which overlies the outer end of the shaft. A nut 38 and washer 39 serves to hold the wheel on the shaft. Cover plates 40 may be employed if desired to protect the bearings.

A structure of the type described permits rolling the truck body either along tracks like the track 16 or upon the floor surface 17. When the truck is lightly loaded and it is desirable to move the truck to different places on the floor surface in order to pick up the various components which will comprise its load, the tread 19 will carry the wheel upon the supporting surface. As the load accumulates and it becomes advantageous to move the truck in a specified path, it can then be rolled upon the tracks so that the iron or steel tread insert carries the load of the truck to the tracks.

The wheel is one which though relatively simple in its ultimate form, nevertheless advantageously combines two metals of highly different characteristics in such fashion that full advantage is taken of the characteristics of each and moreover the wheel structure is so fashioned that the characteristics of one metal in combination with the other produce a composite structure vastly superior to anything suggested by the metal structures taken separately.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent devices.

Having described my invention, what I claim as new and desire to secure by Letters Patent is:

A vehicle wheel for transportation of relatively heavy loads alternatively on smooth hard surfaces and on a rail, said wheel comprising a non-ferrous monometallic structure of relatively tough consistency and of sparkless castable metal and including a hub, an annular rim support extending radially outwardly from the hub and a rim on said rim support, said rim having a thick walled cylindrical shape with a cylindrical peripheral tread surface extending from edge to edge of the wheel, an annular insert of hard wear resistant ferrous metal cast in the rim substantially midway between said edges and at a location spaced inwardly of the tread surface, means forming an annular notch extending from the tread surface into said insert, said notch having a substantially triangular shape with sides thereof converging progressively inwardly and means forming an annular recess at the apex of the notch, said notch being adapted to receive a rail of corresponding angular shape and of depth exceeding the depth of the notch, said outermost end of the notch having a width less than the exposed tread surface on the rim, said insert having rounded outer corners and overhanging flanges on said rim in snug overlying relationship with said rounded corners.

References Cited in the file of this patent

UNITED STATES PATENTS

| | | |
|---|---|---|
| 775,847 | Mowry | Nov. 22, 1904 |
| 950,500 | Woods | Mar. 1, 1910 |
| 1,642,504 | Miller | Sept. 13, 1927 |
| 2,541,514 | Herold | Feb. 13, 1951 |

FOREIGN PATENTS

| | | |
|---|---|---|
| 176,372 | Great Britain | Mar. 2, 1922 |